(12) United States Patent
Ahn

(10) Patent No.: US 10,774,471 B2
(45) Date of Patent: Sep. 15, 2020

(54) METHOD OF RECYCLING BY-PRODUCT GENERATED IN PAPERMAKING PROCESS

(71) Applicant: Korea Institute Of Geoscience And Mineral Resources, Daejeon (KR)

(72) Inventor: Ji-Whan Ahn, Daejeon (KR)

(73) Assignee: Korea Institute Of Geoscience And Mineral Resource, Daejeon (KR)

( * ) Notice: Subject to any disclaimer, the term of this patent is extended or adjusted under 35 U.S.C. 154(b) by 58 days.

(21) Appl. No.: 15/902,093

(22) Filed: Feb. 22, 2018

(65) Prior Publication Data
US 2019/0234018 A1 Aug. 1, 2019

(30) Foreign Application Priority Data
Jan. 31, 2018 (KR) .................. 10-2018-0012374

(51) Int. Cl.
*D21C 11/00* (2006.01)
*D21H 17/67* (2006.01)

(52) U.S. Cl.
CPC ...... *D21C 11/0007* (2013.01); *D21C 11/0064* (2013.01); *D21H 17/675* (2013.01)

(58) Field of Classification Search
None
See application file for complete search history.

(56) References Cited

U.S. PATENT DOCUMENTS 5,075,017 A * 12/1991 Hossain ............... A62D 3/20
210/761

5,665,205 A * 9/1997 Srivatsa ............... D21H 17/70
162/158

(Continued)

FOREIGN PATENT DOCUMENTS

JP H06073690 A 3/1994
JP 2008-207173 A 9/2008

(Continued)

OTHER PUBLICATIONS

Machine translation of KR20100032545,European Patent Office,[online], retr. Oct. 19, 2019,[retr. from the Internet],<URL:https://worldwide.espacenet.com/publicationDetails/description?CC=KR&NR=20100032545A&KC=A&FT=D&ND=3&date=20100326&DB=&locale=en_EP#>. (Year: 2010).*

(Continued)

*Primary Examiner* — Dennis R Cordray
(74) *Attorney, Agent, or Firm* — Harness, Dickey & Pierce, P.L.C.

(57) ABSTRACT

A method of recycling a by-product generated in a papermaking process including, pulverizing a by-product produced in a papermaking process to prepare a pulverized product, burning the pulverized product to prepare a burned product, hydrating the burned product to prepare a hydrate; and manufacturing paper from the hydrate and a paper slurry is provided, which allows reuse of by-products generated in conventional papermaking processes such as lime mud and lime kiln CaO, which is environmentally friendly as well as cost-effective, and also the level of whiteness of the by-products such as lime mud and lime kiln CaO generated in a papermaking process can be improved to that of a high-grade raw material, making it possible to also improve the whiteness of paper.

7 Claims, 20 Drawing Sheets

(56) References Cited

U.S. PATENT DOCUMENTS

| | | | |
|---|---|---|---|
| 5,711,802 A * | 1/1998 | Theil | C04B 2/10 |
| | | | 106/738 |
| 5,897,700 A | 4/1999 | Manning | |
| 9,637,404 B2 * | 5/2017 | Minnich | C02F 9/00 |
| 2007/0062652 A1 * | 3/2007 | Doelle | D21C 9/004 |
| | | | 162/9 |
| 2009/0294083 A1 | 12/2009 | Nanba et al. | |
| 2012/0328497 A1 | 12/2012 | Higgs | |

FOREIGN PATENT DOCUMENTS

| | | |
|---|---|---|
| KR | 100997254 B1 | 11/2010 |
| KR | 101232633 B1 | 2/2013 |
| KR | 101585312 B1 | 1/2016 |
| WO | WO-2012/002324 A1 | 1/2012 |

OTHER PUBLICATIONS

Korean Office Action for corresponding Korean Application No. 10-2018-0012374 dated Mar. 27, 2018.
Australian Office Action dated Jun. 26, 2018 for Australian Application No. 2018201033.
Office Action issued by the Intellectual Property Office of the Philippines dated Jul. 2, 2018 for Philippine Application No. 1/2018/000050.
Hassan Z. Harraz, "Beneficiation and Mineral Processing of Calcium Carbonate and Calcium Sulphate" Aug. 3, 2017, pp. 10-28.
Hazem S. Ahmed et al., "Utilization of Lime-mud as a Filler in Paper Making", Chemistry Department, Faculty of Science, Assiut University, Assuit Egypt, Quena Paper Industry Comp., Nov. 11, 2014.

* cited by examiner (PRIOR ART)

METHOD OF RECYCLING BY-PRODUCT GENERATED IN PAPERMAKING PROCESS

CROSS-REFERENCE TO RELATED APPLICATION

This application claims priority to Korean Patent Application No. 10-2018-0012374 filed on Jan. 31, 2018, and all the benefits accruing therefrom under 35 U.S.C. § 119, the contents of which is incorporated by reference in its entirety.

BACKGROUND OF THE INVENTION

1. Field of the Invention

The present disclosure relates to a method of recycling a by-product generated in a papermaking process.

2. Description of the Related Art

In general, activities for conserving energy and resource are tasks that should be continuously carried out at individual, enterprise, national and global levels. Among these, in the paper industry, which consumes a large amount of resources and energy such as water and natural wood, the conservation of energy through saving resources by recycling waste paper and reducing water as well as through development of new processes is being regarded as a challenge the paper industry should pursue. Also, the development of technology for improving the physical properties of recycled paper through the use of appropriate fillers is being recognized as a very important research field domestically and internationally. In particular, the recycling of waste paper protects forests through the reduction of natural wood used for pulp and thereby it is possible to obtain reduction of greenhouse gas emissions. The recycling of 1 ton of general waste paper can protect 20 trees, reduce the waste energy used for drying paper and slurry of about 1550 Btu, and reduce 100 kg of waste and 50 kg of carbon dioxide emissions. The amount of waste paper recycled of some domestic enterprise reaches up to 500,000 tons per year, which results to saving about 10 million trees and $2.32 \times 1011$ Btu/year and reducing $135 \times 105$ tons/year of waste and 6.8 million ton/year of carbon dioxide emissions. In other words, the recycling of waste paper is an industry that has a very high environmental-friendly effect of reducing waste and carbon dioxide emissions as well as saving energy and natural forest resources.

FIG. 1 is a schematic view showing a process of making pulp by using PCC (Precipitated Calcium Carbonate) for paper filling, used in Moorim P&P CO., LTD. As shown in FIG. 1, in the case of the in-situ method for synthesizing the PCC filler in the pulp slurry, it is possible to omit both the pulverization and the slurry production process after the synthesis of the powder, and no stirring process is required in the pulp slurry, so it can be seen that a large amount of energy can be saved.

However, there has been a problem in that by-products such as lime mud and lime kiln CaO are produced and they need to be treated.

As a prior art related thereto, Korean Granted Patent Publication No. 10-1585312 B1 and Korean Granted Patent Publication No. 10-0997254 B1.

SUMMARY OF THE INVENTION

The present disclosure is directed to providing a method of recycling a by-product generated in a papermaking process that treats the by-product generated in the papermaking process so as to enable it to be reused in a papermaking process.

The problems to be solved by the present disclosure are not limited to the above-mentioned problem(s), and other problem(s) not mentioned can be clearly understood by those skilled in the art from the following description.

According to an aspect of the present disclosure, a method of recycling a by-product generated in a papermaking process may include, pulverizing a by-product produced in a papermaking process to prepare a pulverized product, burning the pulverized product to prepare a burned product, hydrating the burned product to prepare a hydrate, and manufacturing paper from the hydrate and a paper slurry.

In one embodiment, the by-product generated in the papermaking process may include one or more of lime mud and lime kiln CaO.

In one embodiment, burning the pulverized product may be performed at a temperature of 900 to 1,300° C. for 0.5 to 3 hours.

In one embodiment, hydrating the burned product may be performed at a temperature of 20 to 90° C. for 3 to 12 hours after adding water.

In one embodiment, the hydrate may be $Ca(OH)_2$.

In one embodiment, manufacturing the paper may include, adding the paper slurry into a reaction tank, adding the hydrate into the reaction tank and mixing to form a mixture, injecting $CO_2$ gas into the mixture, and adding the $CO_2$ gas-injected mixture to a sheet former for molding into paper.

In one embodiment, the $CO_2$ gas may be injected into the mixture at an injection rate of 50 cc/min.

The paper slurry may be deinked pulp slurry.

According to an aspect of the present disclosure, a paper may be molded by adding a by-product generated in a papermaking process and a paper slurry into a sheet former, and the by-product generated in the papermaking process may include one or more of lime mud and lime kiln CaO.

In one embodiment, the by-product may be a hydrate that was hydrated after being burned.

In one embodiment, a whiteness of the paper may be 80 to 90.

When a method of recycling a by-product generated in a papermaking process according to the present disclosure is used, it is possible to reuse by-products generated in conventional papermaking processes such as lime mud and lime kiln CaO, which is environmentally friendly as well as cost-effective.

Further, the level of whiteness of lime mud and lime kiln CaO which are by-products generated in a papermaking process can be improved to that of an high-grade raw material, and thereby it is possible to also improve the whiteness of paper.

DETAILED DESCRIPTION OF THE INVENTION

Figure 1:
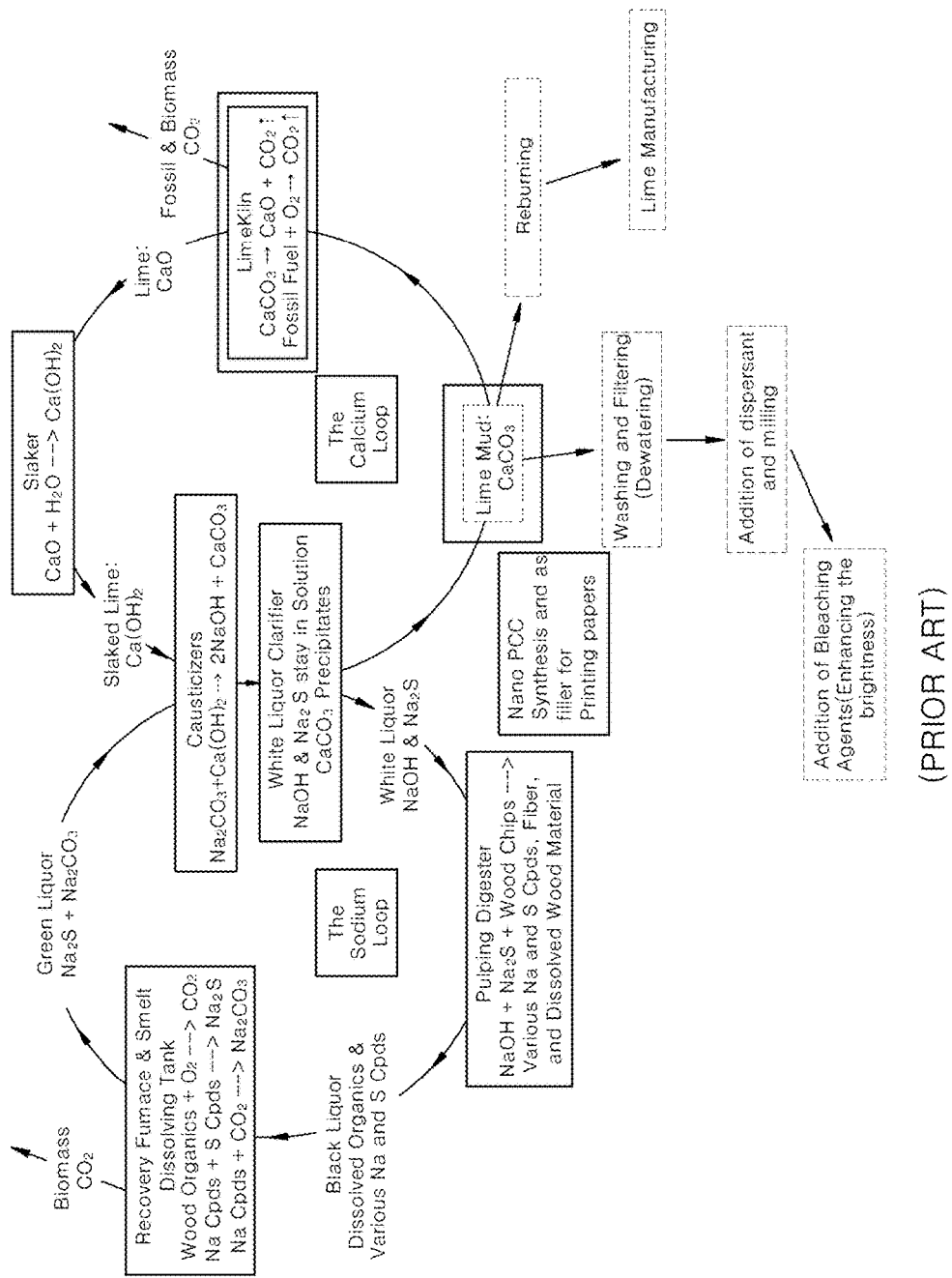
FIG. 1 is a schematic view showing a process of making pulp by using PCC (Precipitated Calcium Carbonate) for paper filling, used in Moorim P&P CO., LTD.

The advantages and features of the present disclosure and the manner of accomplishing it will become apparent with reference to the embodiments described in detail below with reference to the accompanying drawings. The present disclosure may, however, be embodied in many different forms and should not be construed as limited to the exemplary embodiments set forth herein. Rather, these embodiments are provided so that this disclosure will be thorough and complete, and will fully convey the scope of the invention to those skilled in the art, and the invention is only defined by the scope of the claims.

The shapes, sizes, ratios, angles, numbers and the like disclosed in the drawings for describing the embodiments of the present disclosure are illustrative, and thus the present invention is not limited thereto. Like reference numerals refer to like elements throughout the specification.

In the following description of the present disclosure, a detailed description of known functions and configurations incorporated herein will be omitted when it may make the subject matter of the present disclosure rather unclear.

In the following description of the present disclosure, a detailed description of known related arts will be omitted when it is determined that the gist of the present invention may be unnecessarily obscured.

In the case where the word 'includes', 'having', 'consists', etc. are used in this specification, other parts may be added unless 'only~' is used. Unless the context clearly dictates otherwise, in a case where a configuration is expressed in singular form, a case of including the same in plurality may be included.

In the case of describing positional relationship, for example, if the positional relationship between two parts is described as 'on', 'on an upper part', 'on a lower part', 'next to', and so on, unless 'immediately' or 'directly' is used, one or more other parts may be positioned between the two parts.

In the case of describing temporal relationship, for example, if a temporal posterior relationship is described by 'after', 'following', 'and then', 'before', and so on, unless 'immediately' or 'directly' is used, a case of being non-continuous may be included.

It is to be understood that each of the features of the various embodiments of the present disclosure may be coupled or combined with each other, partially or entirely, and technically various interlocking and driving are possible, and that the embodiments may be practiced independently of each other as well as practiced together in association.

The present disclosure is characterized in that it is configured to include pulverizing a by-product produced in a papermaking process to prepare a pulverized product in step S100, burning the pulverized product to prepare a burned product in step S200, hydrating the burned product to prepare a hydrate in step S300, and manufacturing paper from the hydrate and a paper slurry in step S400.

The present disclosure is directed to provide a method of recycling a by-product generated in a papermaking process that treats the by-product generated in the papermaking process so as to enable it to be reused in a papermaking process.

When a method of recycling a by-product generated in a papermaking process according to the present disclosure is used, it is possible to reuse by-products generated in conventional papermaking processes such as lime mud and lime kiln CaO, which is environmentally friendly as well as cost-effective. Further, the level of whiteness of lime mud and lime kiln CaO which are by-products generated in a papermaking process can be improved to that of a high-grade raw material, and thereby it is possible to also improve the whiteness of paper.

Hereinafter, referring to FIG. 2, a method of recycling a by-product generated in a papermaking process according to an embodiment of the present disclosure will be described.

Figure 2:
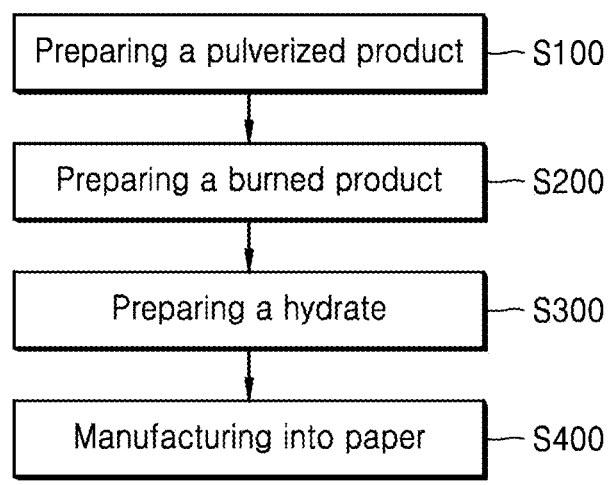
FIG. 2 is a flowchart illustrating a method of recycling a by-product generated in a papermaking process according to an embodiment of the present disclosure.

FIG. 2 is a flowchart illustrating a method of recycling a by-product generated in a papermaking process according to an embodiment of the present invention.

A method of recycling a by-product generated in a papermaking process according to an embodiment of the present disclosure is characterized in that it includes pulverizing a by-product produced in a papermaking process to prepare a pulverized product in step S100, burning the pulverized product to prepare a burned product in step S200, hydrating the burned product to prepare a hydrate in step S300, and manufacturing paper from the hydrate and a paper slurry in step S400.

In the method of recycling a by-product generated in a papermaking process according to an embodiment of the present disclosure, a by-product produced in a papermaking process is pulverized to prepare a pulverized product in step S100.

The method of pulverizing the by-product to prepare the pulverized product is not limited.

The by-product of step S100 generated in the papermaking process may include one or more of lime mud and lime kiln CaO.

Figure 3A:
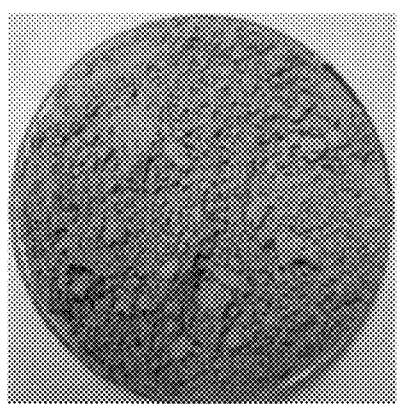
FIG. 3A is an image showing lime mud.
Figure 3B:
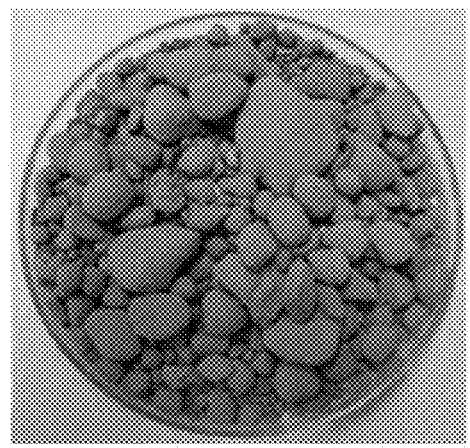
FIG. 3B is an image showing lime kiln CaO.

FIG. 3A is a image showing lime mud. FIG. 3B is a image showing lime kiln CaO.

The lime mud may be a by-product having a greenish powder form, and the lime kiln CaO may be in a yellowish clinker form.

The reason for pulverizing of the by-product in step S100 is to increase the surface area of the by-product, such as lime mud and lime kiln CaO, to improve reaction.

In the method of recycling a by-product generated in a papermaking process according to an embodiment of the present disclosure, the pulverized product of step S100 is burned to prepare a burned product in step S200.

The burning of the pulverized product in step S200 may be performed at a temperature of 900 to 1,300° C. for 0.5 to 3 hours, and more particularly, at a temperature of 1,000 to 1,200° C. for 1 to 2 hours When the temperature is 900° C. or less, the whiteness of the by-product decreases and thus causes a problem of lowering the quality of paper which the final product. When the temperature is 1,300° C. or more, it is not cost-effective due to high energy consumption, and so the above-mentioned range is preferable.

In the method of recycling a by-product generated in a papermaking process according to an embodiment of the present disclosure, the burned product of step S200 is hydrated to prepare a hydrate in step S300.

The hydrate prepared in step S300 may be $Ca(OH)_2$.

Hydrating the burned product in step S300 may be performed at a temperature of 20 to 90° C. for 3 to 12 hours after adding water to the burned product of step S200, and more particularly at a temperature of 30 to 80° C. for 3 to 12 hours.

When the temperature is 20° C. or less, the whiteness of the by-product decreases and thus causes a problem of lowering the quality of paper which is the final product. When the temperature is 90° C. or more, it causes degeneration of the by-product, and so the above-mentioned range is preferable.

Likewise, when the reaction time is out of range of the 3 to 12 hours, it causes the problem of the whiteness of the by-product decreasing, and so the above-mentioned range is preferable.

In the method of recycling a by-product generated in a papermaking process according to an embodiment of the present disclosure, paper is manufactured from the hydrate of step S300 and a paper slurry in step S400.

Manufacturing paper in step S400 may include processes of, adding the paper slurry of step into a reaction tank, adding the hydrate of step S300 into the reaction tank and mixing to form a mixture, injecting $CO_2$ gas into the mixture, and adding the $CO_2$ gas-injected mixture to a sheet former for molding into paper.

The $CO_2$ gas may be injected into the mixture at an injection rate of 50 cc/min.

The paper slurry may be deinked pulp slurry.

Paper according to an embodiment of the present disclosure may be molded by adding a by-product generated in a papermaking process and paper slurry into a sheet former, and the by-product generated in the papermaking process may include one or more of lime mud and lime kiln CaO.

The by-product may be a hydrate that was hydrated after being burned.

The whiteness of the paper may be 80 to 90.

Hereinafter, referring to examples and experimental examples, the present disclosure will be described in further detail. However, the following examples and experimental examples are for illustrative purposes only and are not intended to limit the scope of the present invention.

Example 1

The lime kiln CaO generated as a by-product in a papermaking process was pulverized to be prepared.

Then, the pulverized lime kiln CaO was hydrated at a temperature of 80° C. for 6 hours to prepare a hydrate.

Example 2

The same procedure as Example 1 was followed except that the pulverized lime kiln CaO was hydrated at 30° C. for 6 hours to prepare a hydrate.

Example 3

The same procedure as Example 1 was followed except that the pulverized lime kiln CaO was hydrated at 80° C. for 3 hours to prepare a hydrate.

Example 4

The same procedure as Example 1 was followed except that the pulverized lime kiln CaO was hydrated at 80° C. for 6 hours to prepare a hydrate.

Example 5

The same procedure as Example 1 was followed except that the pulverized lime kiln CaO was hydrated at 80° C. for 12 hours to prepare a hydrate.

Example 6

The lime kiln CaO generated as a by-product in a papermaking process was pulverized to be prepared.

Then, the pulverized lime kiln CaO was burned at a temperature of 1,200° C. for 2 hours to prepare a burned product.

Example 7

The lime kiln CaO generated as a by-product in a papermaking process was pulverized to be prepared.

Next, the pulverized lime kiln CaO was burned at a temperature of 1,200° C. for 2 hours and then was hydrated at 80° C. for 6 hours to prepare a hydrate.

Example 8

The same procedure as Example 7 was followed except that the burned lime kiln CaO was hydrated at 80° C. for 12 hours to prepare a hydrate.

Example 9

The lime mud generated as a by-product in a papermaking process was pulverized to be prepared.
Then, the pulverized lime mud was hydrated at 80° C. for 6 hours to prepare a hydrate.

Example 10

The lime mud generated as a by-product in a papermaking process was pulverized to be prepared.
Next, the pulverized lime mud was burned at a temperature of 1,200° C. for 2 hours and then was hydrated at 80° C. for 3 hours to prepare a hydrate.

Example 11

The same procedure as Example 10 was followed except that pulverized lime mud was burned at a temperature of 1,000° C.

Example 12

The same procedure as Example 11 was followed except that the burned product was hydrated at 80° C. for 6 hours to prepare a hydrate.

Example 13

The same procedure as Example 10 was followed except that the burned product was hydrated at 80° C. for 6 hours to prepare a hydrate.

Example 14

The same procedure as Example 10 was followed except that the burned product was hydrated at 80° C. for 12 hours to prepare a hydrate.

Example 15

The lime mud generated as a by-product in a papermaking process was pulverized to be prepared.
The pulverized lime mud was burned at a temperature of 1,200° C. for 2 hours to prepare a burned product.

Comparative Examples 1 to 4

The quicklime of company B (Comparative Example 1), quicklime of company P (Comparative Example 2), limestone of company D (Comparative Example 3), and quicklime of company W (Comparative Example 4), which are sold on the market were purchased and prepared.

<Analysis>

1. Property Analysis of By-Products Lime Mud and Lime Kiln CaO

Lime mud and lime kiln CaO are by-products generated in the process of making pulp in Moorim P&P CO., LTD. as shown in FIG. 1. FIGS. 3A and 3B are images showing lime mud and lime kiln CaO, respectively.

The lime mud is a by-product having a slightly greenish powder form and the lime kiln CaO is in a yellowish clinker form.

Tables 1 and 2 below show the chemical composition (XRF analysis) of lime mud, lime kiln CaO, mined high-grade limestone and Comparative Examples 1 to 3.

TABLE 1

Chemical composition (XRF) of lime mud and lime kiln CaO

| Classification (Unit: wt %) | SiO | $Al_2O_3$ | $Fe_2O_3$ | CaO | MgO | $SO_3$ | $P_2O_5$ | $Na_2O$ | $K_2O$ | Ig-loss |
|---|---|---|---|---|---|---|---|---|---|---|
| Lime Kiln CaO | 2.78 | 2.62 | 0.20 | 89.3 | 2.38 | 3.94 | — | 1.60 | — | — |
| Lime mud | 0.26 | 0.32 | 0.39 | 53.1 | 1.12 | 0.58 | 0.22 | 0.99 | 0.05 | 42.9 |
| Limestone | 1.40 | 0.68 | 0.44 | 54.0 | 0.91 | 0.03 | — | 0.09 | 0.10 | — |

TABLE 2

Chemical composition (XRF) of comparative examples 1 to 3

| | $SiO_2$ | $Al_2O_3$ | $Fe_2O_3$ | CaO | MgO |
|---|---|---|---|---|---|
| Comparative Example 1 (quicklime) | 0.78 | 0.35 | 0.15 | 88.5 | 0.87 |
| Comparative Example 2 (quicklime) | 0.57 | 0.49 | 0.17 | 89.6 | 0.92 |
| Comparative Example 3 (limestone) | 0.04 | 0.21 | 0.34 | 56.96 | 0.35 |

As can be seen from Tables 1 and 2, there is a difference in impurities such as $SiO_2$ and $Al_2O_3$ components of lime mud and lime kiln CaO as compared with Comparative Examples 1 to 3, but it can be confirmed that the component of CaO is an excellent by-product.

Tables 3 and 4 below show mineral analysis (XRD analysis) of limestone mud, lime kiln CaO, mined high-grade limestone and Comparative Examples 3 and 4.

Figure 4A:
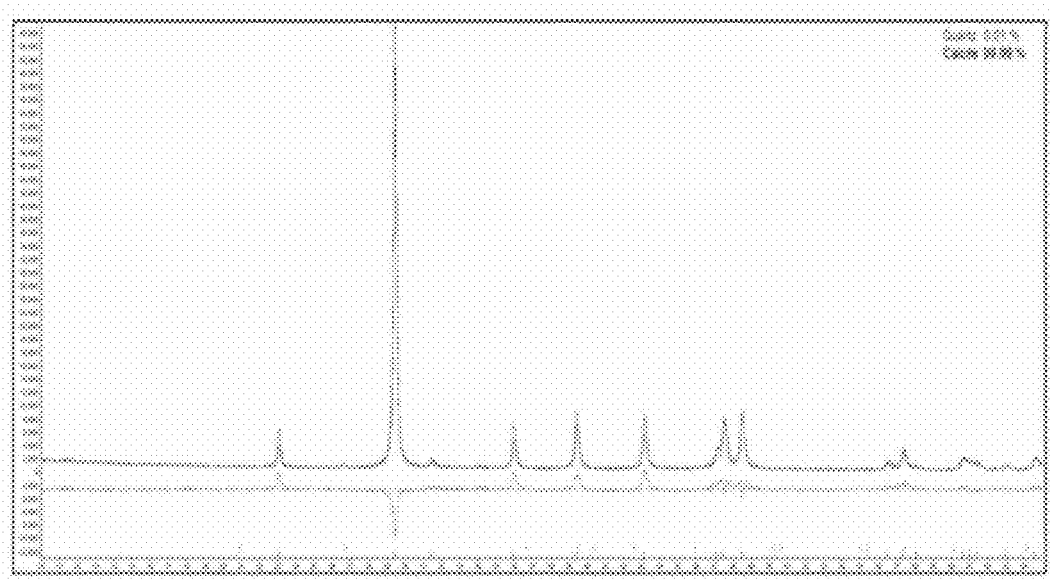
FIG. 4A is showing an XRD analysis of lime mud.

FIG. 4A is showing an XRD analysis of lime mud.

Figure 4B:
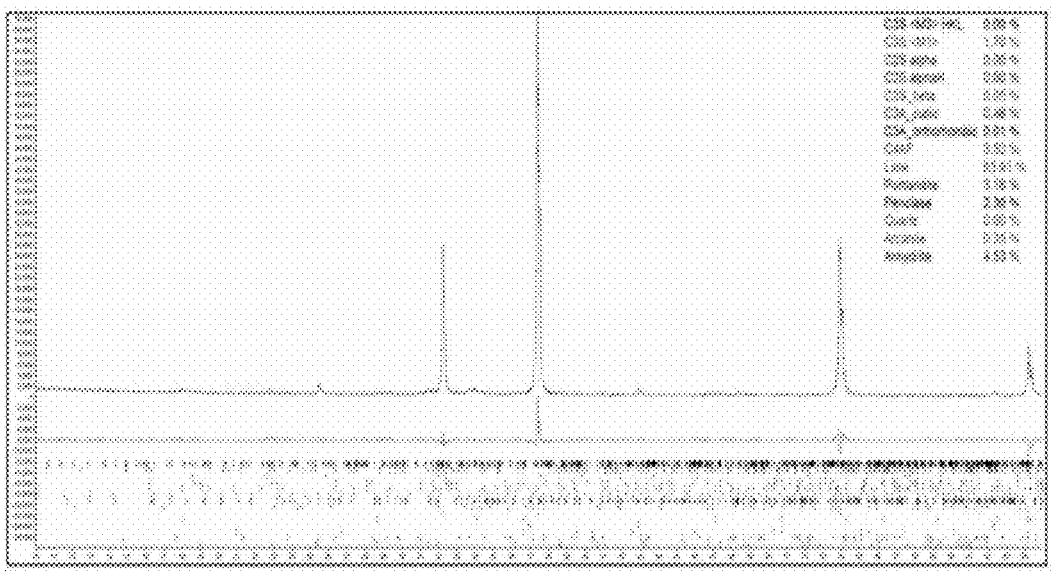
FIG. 4B is showing an XRD analysis of lime kiln CaO.

FIG. 4B is showing an XRD analysis of lime kiln CaO.

TABLE 3

Mineral composition of lime mud and lime kiln CaO

| Classification (Unit %) | Calcite (CaCO$_3$) | Dolomite (CaMg(CO$_3$)$_2$) | Quartz (SiO$_2$) | Lime (CaO) | Anhydrite (CaSO$_4$) | Portland stone (Ca(OH)$_2$) | Other | Total |
|---|---|---|---|---|---|---|---|---|
| Lime Kiln CaO | — | — | — | 83.91 | 4.53 | 3.16 | 8.4 | 100 |
| Lime mud | 99.99 | — | 0.01 | — | — | — | — | 100 |
| Limestone | 92.64 | 4.62 | 2.74 | — | — | — | — | 100 |

TABLE 4

Mineral composition of comparative examples 3 and 4

| Classification (Unit %) | Calcite (CaCO$_3$) | Dolomite (CaMg(CO$_3$)$_2$) | Quartz (SiO$_2$) | Lime (CaO) | Anhydrite (CaSO$_4$) | Portland stone (Ca(OH)$_2$) | Other | Total |
|---|---|---|---|---|---|---|---|---|
| Comparative Example 4 (quicklime) | — | 0.05 | — | 95.90 | 0.01 | 0.99 | 3.05 | 100 |
| Comparative Example 3 (limestone) | 99.51 | — | 0.49 | — | — | — | — | 100 |

Referring to Tables 3, 4, and FIG. 4, it can be seen that, the lime kiln CaO and the lime mud exist as minerals wherein the lime kiln CaO is mostly of CaO component and the lime mud is mostly calcite. Thus, it can be seen that the lime kiln CaO and the lime mud have similar mineral phases as that of comparative example 4(quicklime) and comparative example 3(limestone), respectively.

2. Characteristic Analysis of Burning and Hydrating Reactions of Lime Kiln CaO

FIG. 5 is a image showing lime kiln CaO, wherein (A) to (D) are images showing lime kiln CaO as a by-product, pulverization process, hydration process, and hydrated lime kiln CaO according to Example 1, respectively.

Figure 5A:
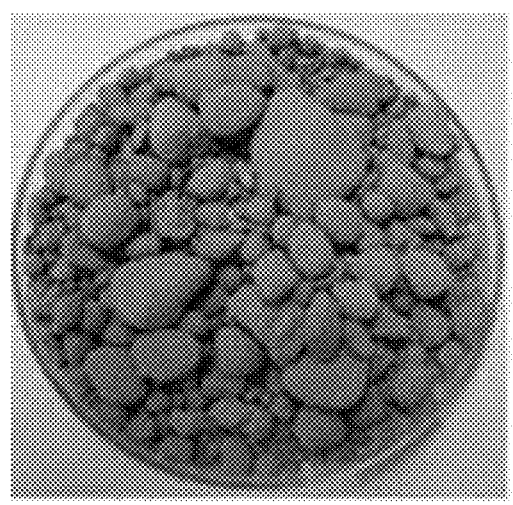
FIG. 5A is an image showing lime kiln CaO as a by-product.
Figure 5B:
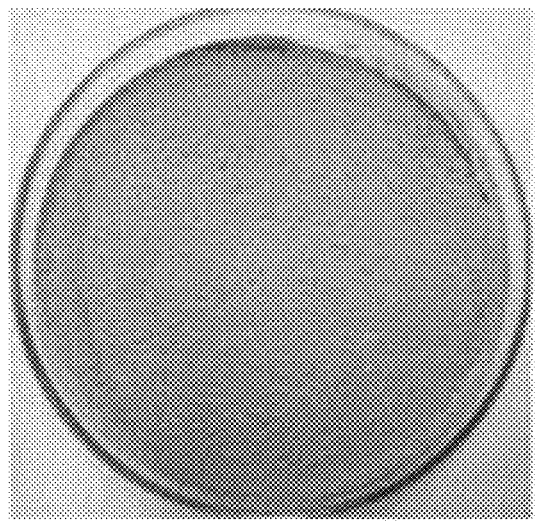
FIG. 5B is an image showing lime kiln CaO after a pulverization process.
Figure 5C:
FIG. 5C is an image showing lime kiln CaO during a hydration process.
Figure 5D:
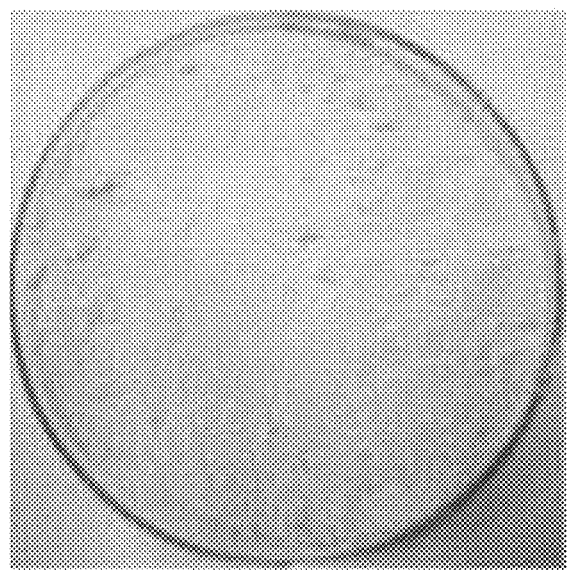
FIG. 5D is an image showing hydrated lime kiln CaO according to Example 1.
Figure 6:
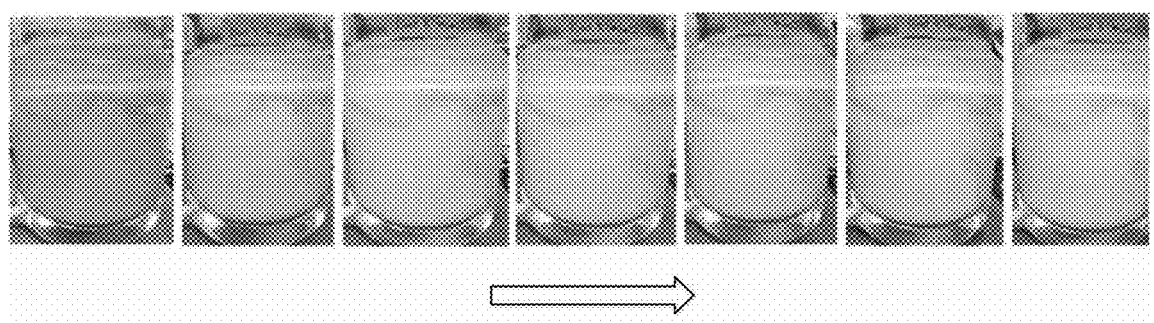
FIG. 6 shows images of the hydration process according to time of Example 1 (total 3 hours).
Figure 7A:
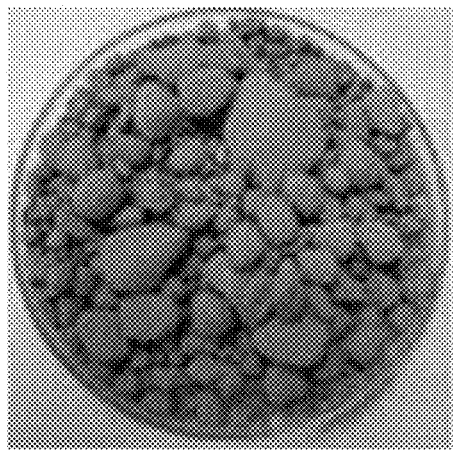
FIG. 7A shows color of lime kiln CaO.
Figure 7B:
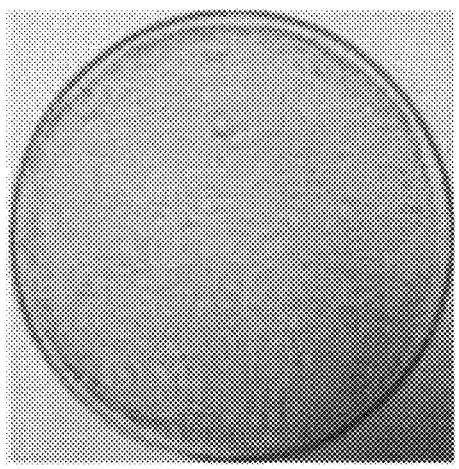
FIG. 7B shows color of lime kiln CaO according to Example 2.
Figure 7C:
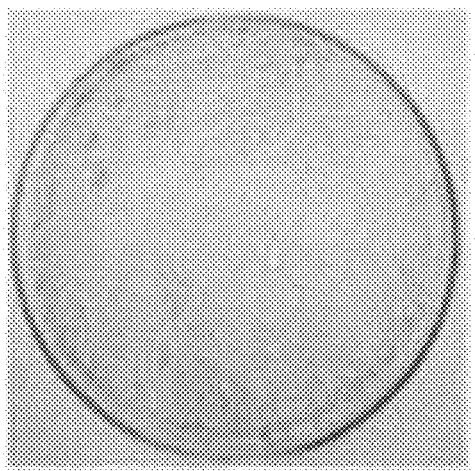
FIG. 7C shows color of lime kiln CaO according to Example 3.
Figure 7D:
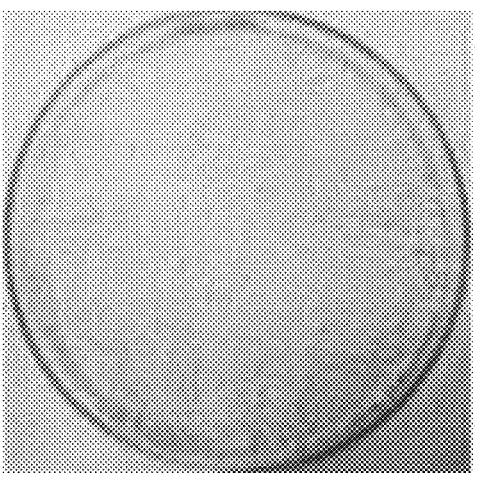
FIG. 7D shows color of lime kiln CaO according to Example 1.
Figure 7E:
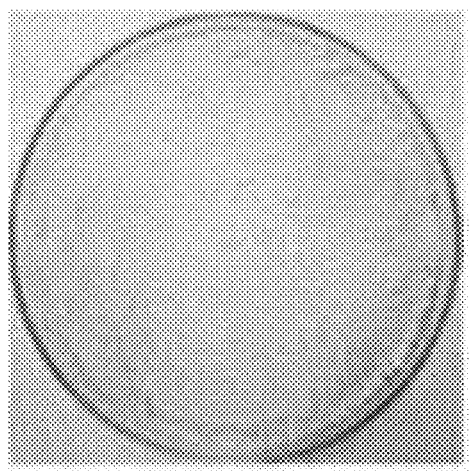
FIG. 7E shows color of lime kiln CaO according to Example 5.

FIG. 5A is an image showing lime kiln CaO as a by-product. FIG. 5B is an image showing lime kiln CaO after a pulverization process. FIG. 5C is an image showing lime kiln CaO during a hydration process. FIG. 5D is an image showing hydrated lime kiln CaO according to Example 1. FIG. 6 shows images of the hydration process according to time of Example 1 (total 3 hours). FIG. 7A shows color of lime kiln CaO. FIG. 7B shows color of lime kiln CaO according to Example 2. FIG. 7C shows color of lime kiln CaO according to Example 3. FIG. 7D shows color of lime kiln CaO according to Example 1. FIG. 7E shows color of lime kiln CaO according to Example 5.

Referring to FIGS. 5 to 6, from FIG. 5A to FIG. 5D the color of the lime kiln CaO changes to a whiter color, and as the time of hydration increases, it can be seen that the color changes to white. It can be seen that the color of the substance that has been hydrated at 80° C. for 12 hours (Example 5) shows a brighter color than that of the substance that has been hydrated at 30° C. for 6 hours (Example 1).

From this, it can be seen that the color of the hydrated substance becomes brighter as the temperature is higher.

3. FT-IR Analysis of Lime Kiln CaO and Measurement of Whiteness

Figure 8:
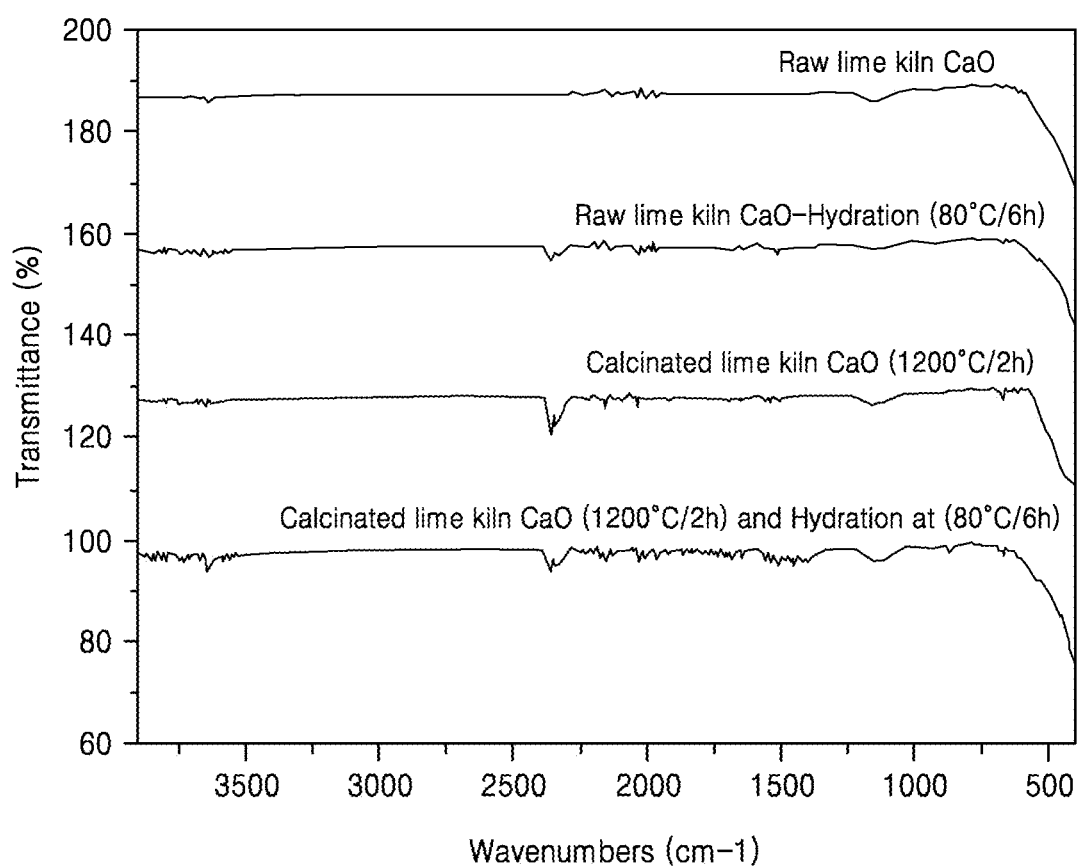
FIG. 8 is an FT-IR analysis graph of lime kiln CaO, Example 1, Example 6, and Example 7.
Figure 9A:
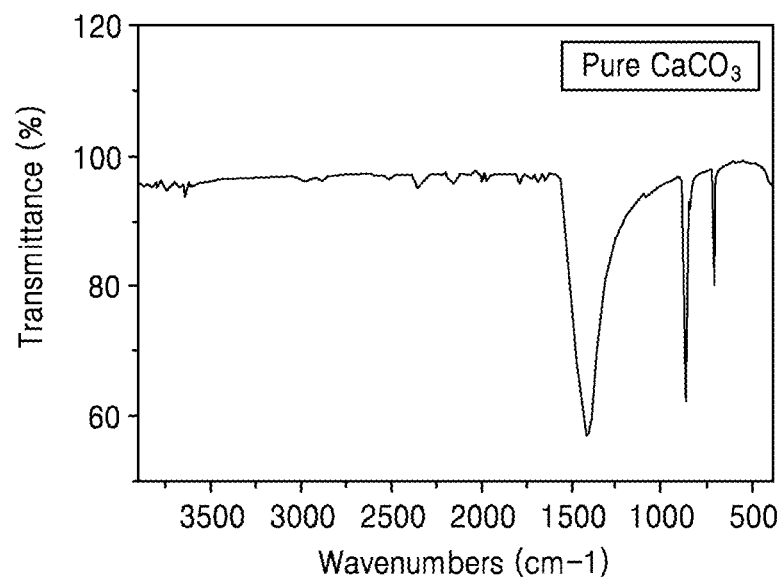
FIG. 9A is an FT-IR analysis graphs of pure $CaCO_3$.
Figure 9B:
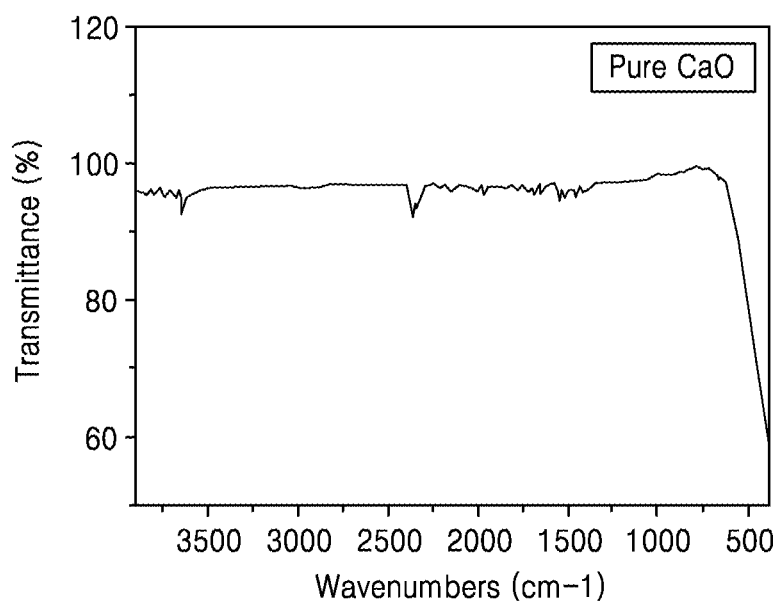
FIG. 9B is an FT-IR analysis graphs of pure CaO.
Figure 9C:
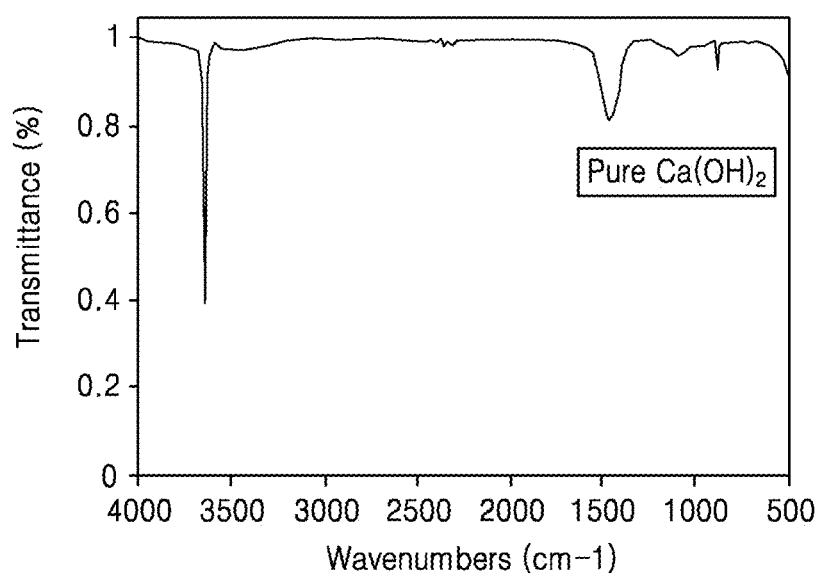
FIG. 9C is an FT-IR analysis graphs of pure $Ca(OH)_2$.

FIG. 8 is an FT-IR analysis graph of lime kiln CaO, Example 1, Example 6, and Example 7. FIG. 9A is an FT-IR analysis graphs of pure CaCO$_3$. FIG. 9B is an FT-IR analysis graphs of pure CaO. FIG. 9C is an FT-IR analysis graphs of pure Ca(OH)$_2$.

Referring to FIGS. 8 to 9C, when lime kiln CaO is compared with a reagent grade CaO, it can be seen that they are consistent, and when hydrated, it can be seen to be almost the same as a reagent grade Ca(OH)$_2$. Through this, it can be seen that in a main hydration reaction CaO is changed from CaO to Ca(OH)$_2$.

Table 5 below shows the results of the measurement of whiteness of lime kiln CaO, Example 1, Example 6, Example 7 and Example 8. (Whiteness is set as a maximum of 100, the standard of a general A4 paper)

TABLE 5

Measurement results of whiteness

| Sample name | Whiteness |
|---|---|
| Lime Kiln CaO | 70.33 |
| Example 1 | 89.43 |
| Example 6 | 68.61 |
| Example 7 | 88.18 |
| Example 8 | 88.42 |

As shown in Table 5, lime kiln CaO as a by-product, has a whiteness of about 70.33 and is a yellow-greenish raw material. However, after hydration at 80° C. (Example 1), the whiteness increased 27% to 89.43. In particular, Example 7, where the by-product was hydrated after burning, also showed similar values of 88.18, indicating that the degree of whiteness was increased by hydrating the by-product, lime kiln CaO.

4. Characteristic Analysis of Burning and Hydrating Reactions of Lime Mud

Figure 10A:
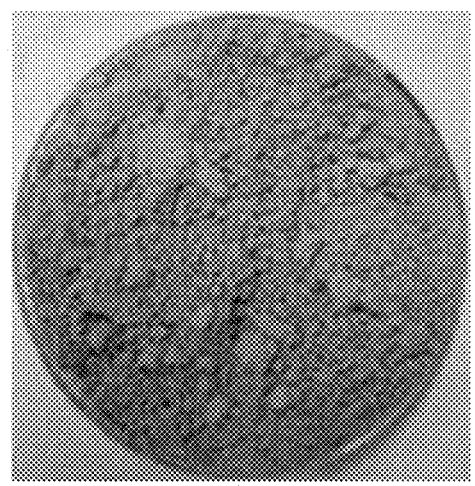
FIG. 10A is an image showing lime mud.
Figure 10B:
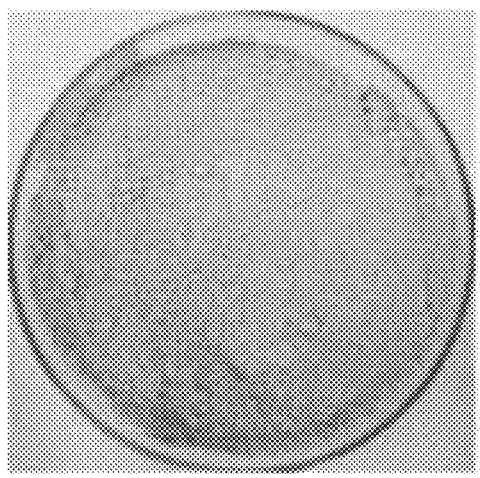
FIG. 10B is an image showing lime mud after a pulverization process.
Figure 10C:
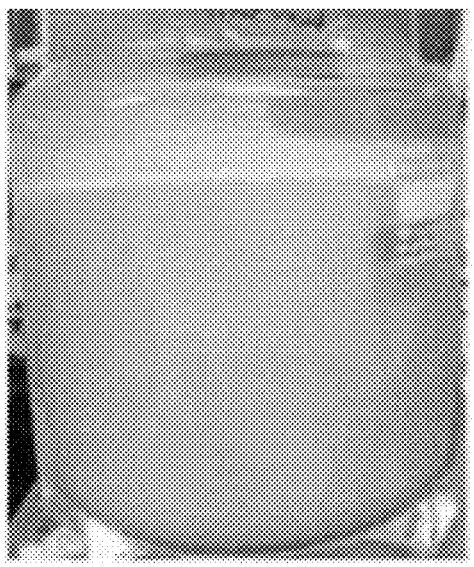
FIG. 10C is an image showing lime mud during a hydration process.
Figure 10D:
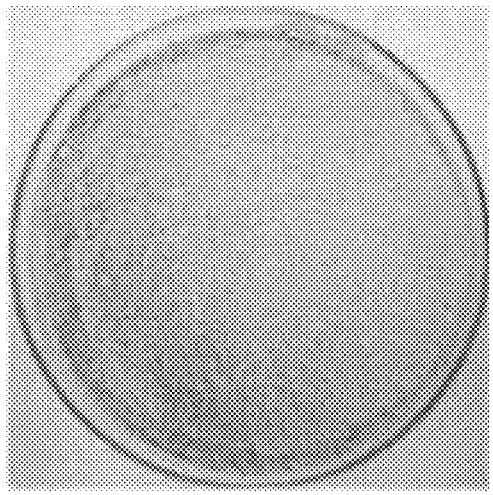
FIG. 10D is an image showing hydrated lime mud according to Example 9.

FIG. 10A is an image showing lime mud. FIG. 10B is an image showing lime mud after a pulverization process. FIG. 10C is an image showing lime mud during a hydration process. FIG. 10D is an image showing hydrated lime mud according to Example 9.

Figure 11A:
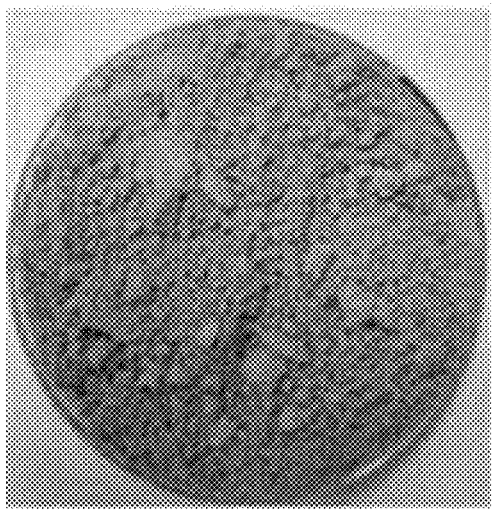
FIG. 11A is an image showing lime mud.
Figure 11B:
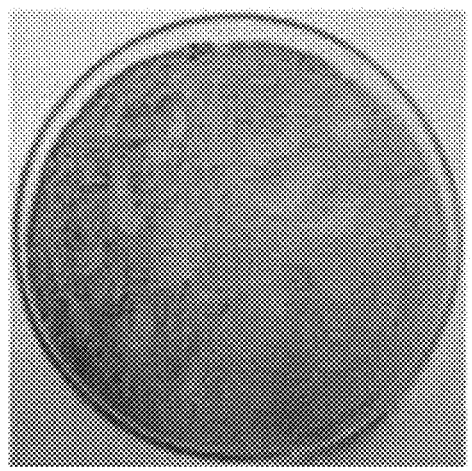
FIG. 11B is an image showing lime mud after burning.
Figure 11C:
FIG. 11C is an image showing lime mud during a hydration process.
Figure 11D:
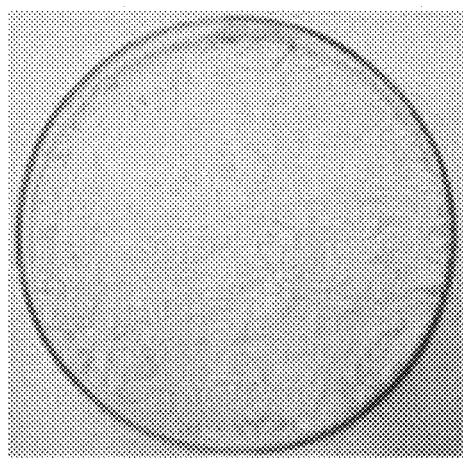
FIG. 11D is an image showing hydrated lime mud according to Example 10.

FIG. 11A is an image showing lime mud. FIG. 11B is an image showing lime mud after burning. FIG. 11C is an image showing lime mud during a hydration process. FIG. 11D is an image showing hydrated lime mud according to Example 10.

Figure 12A:
FIG. 12A is an image showing lime mud.
Figure 12B:
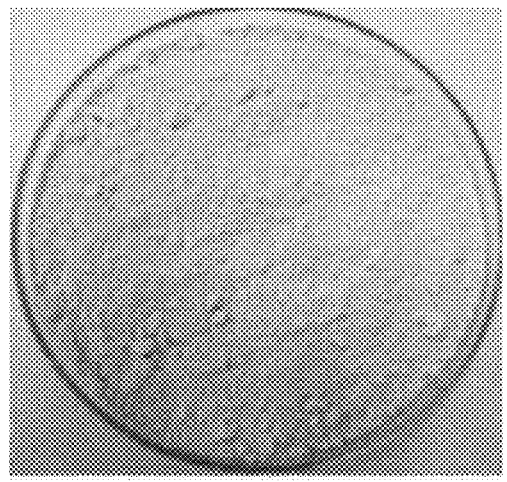
FIG. 12B is an image showing lime mud according to Example 11.
Figure 12C:
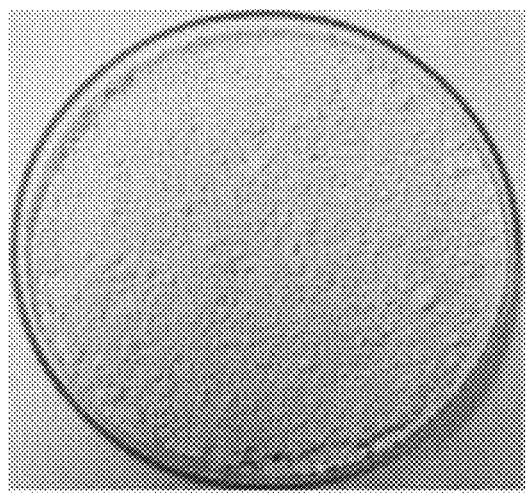
FIG. 12C is an image showing lime mud according to Example 12.

FIG. 12A is an image showing lime mud. FIG. 12B is an image showing lime mud according to Example 11. FIG. 12C is an image showing lime mud according to Example 12.

Figure 13A:
FIG. 13A is an image showing lime mud.
Figure 13B:
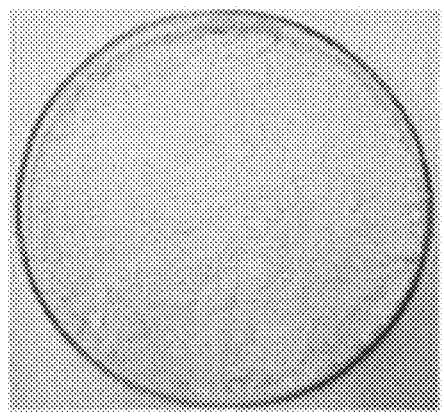
FIG. 13B is an image showing lime mud according to Example 10.
Figure 13C:
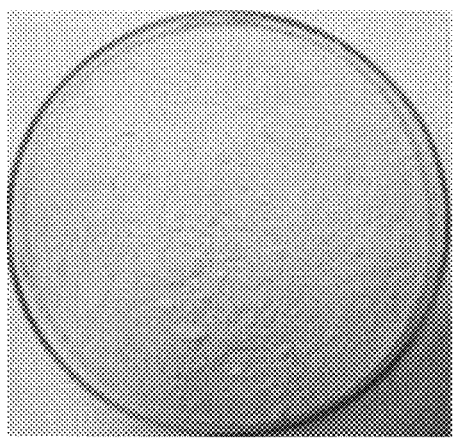
FIG. 13C is an image showing lime mud according to Example 13.
Figure 13D:
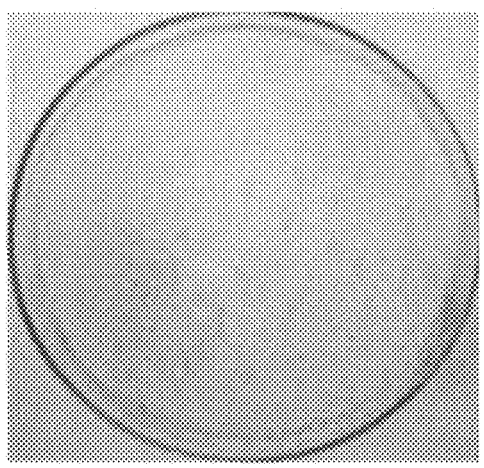
FIG. 13D is an image showing lime mud according to Example 14.

FIG. 13A is an image showing lime mud. FIG. 13B is an image showing lime mud according to Example 10. FIG. 13C is an image showing lime mud according to Example 13. FIG. 13D is an image showing lime mud according to Example 14.

Referring to FIGS. 10 to 13, it can be seen that there is no difference in color between the lime mud as a by-product and Example 9. However, the substance wherein the lime mud as the by-product was burned before being hydrated (Example 10) changed into a white color as the time of hydration increased. Further, it can be seen that Examples 10, 13 and 14 which were burned at a temperature of 1,200° C. and then hydrated had an excellent whiteness compared to that of Examples 11 and 12 which were burned at a temperature of 1,000° C. and then hydrated.

5. FT-IR Analysis of Lime Mud and Measurement of Whiteness

Figure 14:
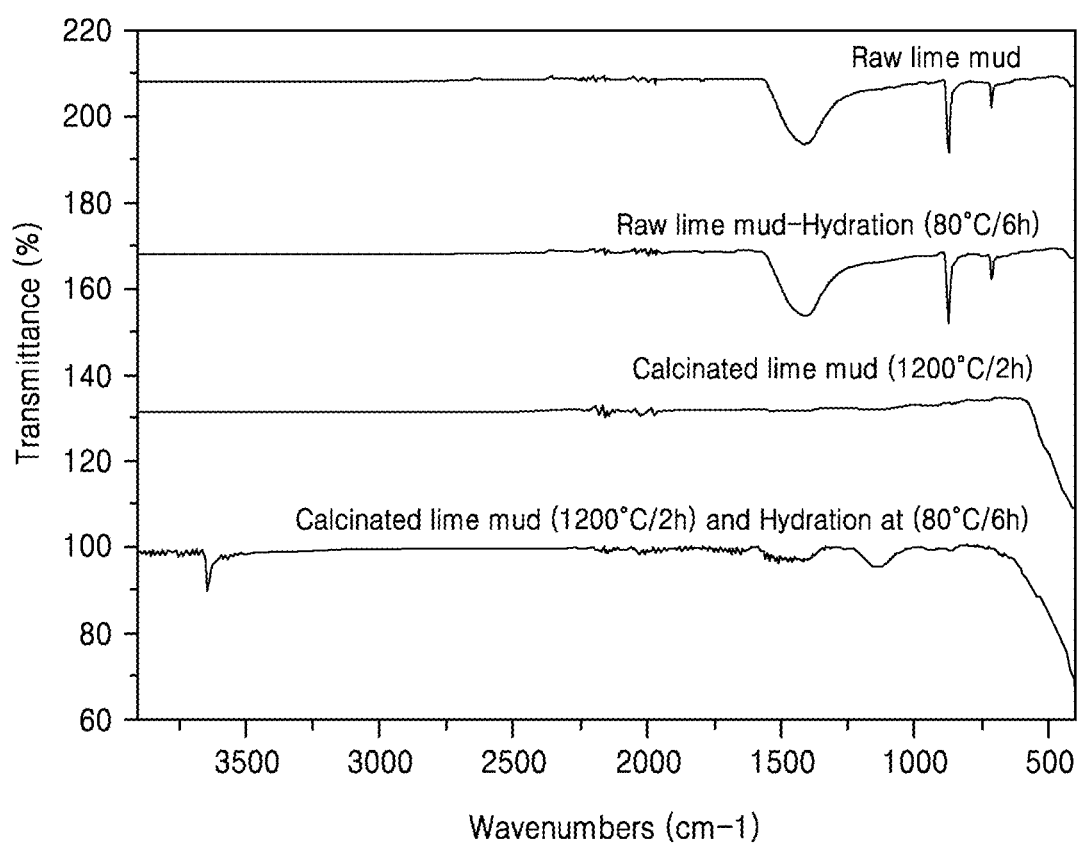
FIG. 14 is an FT-IR analysis graph of lime mud, Example 9, Example 13, and Example 15.

FIG. 14 is an FT-IR analysis graph of lime mud, Example 9, Example 13, and Example 15. FIGS. 9A to 9C are FT-IR analysis graphs of pure $CaCO_3$, pure CaO, and pure $Ca(OH)_2$, respectively.

Referring to FIGS. 14 and 9A to 9C, when lime mud is compared with a reagent grade CaO, it can be seen that they are consistent, and although there is almost no difference when hydrated, it can be seen to be almost the same as a reagent grade $Ca(OH)_2$ when hydrated after burning. Through this, it can be seen that in a main hydration reaction CaO is changed from CaO to $Ca(OH)_2$.

Table 6 below shows the results of the measurement of whiteness of lime mud, Example 9, Example 13, Example 14 and Example 15. (Whiteness is set as a maximum of 100, the standard of a general A4 paper)

TABLE 6

| Measurement results of whiteness | |
|---|---|
| Sample name | Whiteness |
| Lime Mud | 78.88 |
| Example 9 | 80.53 |
| Example 13 | 89.41 |
| Example 14 | 89.67 |
| Example 15 | 72.51 |

As shown in Table 6, lime mud as a by-product, has a whiteness of about 78.88 and is a greenish raw material, but after hydration at 80° C. (Example 9), the whiteness increased slightly to 80.53. However, Example 14 wherein hydration after burning was performed, the whiteness increased 13%. As a result, it was found that the whiteness increases when the lime mud is hydrated after burning.

Experimental Example 1

On the basis of the above analysis, Examples 9 and 14 were used to prepare a hand-sheet using a laboratory scale sheet former.

Figure 15:
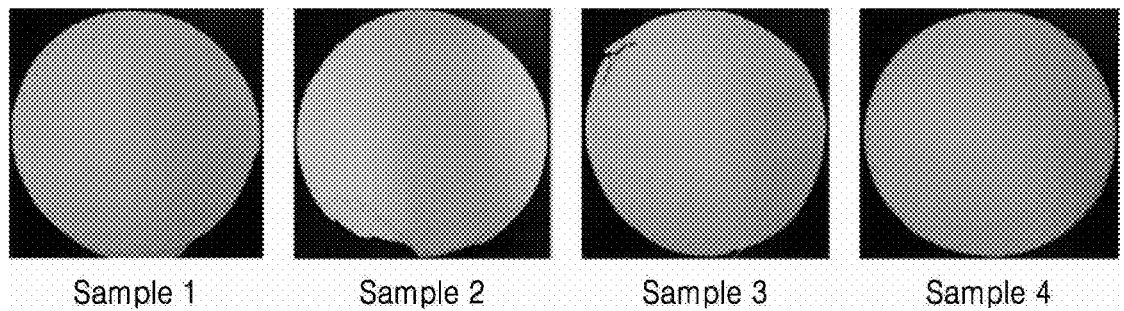
FIG. 15 shows images of samples 1 to 4.

FIG. 15 shows images of a hand-sheet of samples 1 to 4.

Tables 7 and 8 chart the whiteness and experimental conditions of the manufactured paper.

Examples 9 and 14 were used as fillers in the paper manufacturing, and waste paper generated in a papermaking process in Moorim P&P CO., LTD was reused as pulp.

TABLE 7

Experimental conditions and whiteness results of applying papermaking of Example 9

| Sample Name | Waste paper pulp (g) | $Ca(OH)_2$ | Example 9 | Whiteness |
|---|---|---|---|---|
| Sample 1 $Ca(OH)_2$ + pulp | 300 | 30 | — | 91.24 |
| Sample 2 Example 9 + pulp | 300 | — | 30 | 82.03 |
| Sample 3 Example 9 + $Ca(OH)_2$ + pulp | 300 | 10 | 20 | 86.22 |
| Sample 4 Example 9 + $Ca(OH)_2$ + pulp | 300 | 20 | 10 | 85.17 |

As shown in Table 7, it can be seen that the whiteness of the hand-sheet using Example 9 alone was 82.03, which was usable as a recycled paper. In the case of using Example 9 and a reagent grade Ca(OH), it can be seen that the whiteness of the hand-sheet is improved to 85 to 86. Based thereon, it was found that it could be fully utilized in waste paper recycling.

TABLE 8

Experimental conditions and whiteness results of applying papermaking of Example 14

| Sample Name | Waste paper pulp (g) | $Ca(OH)_2$ | Example 9 | Whiteness |
|---|---|---|---|---|
| Sample 1 $Ca(OH)_2$ + pulp | 300 | 30 | — | 91.24 |
| Sample 5 Example 14 + pulp | 300 | — | 30 | 77.97 |
| Sample 6 Example 14 + $Ca(OH)_2$ + pulp | 300 | 10 | 20 | 78.53 |
| Sample 7 Example 14 + $Ca(OH)_2$ + pulp | 300 | 20 | 10 | 90.31 |

As shown in Table 8, it can be seen that the whiteness of the hand-sheet using Example 14 alone was 77.97, which was usable as a recycled paper and had a lower whiteness than when lime mud was used. In the case of adding and using Example 14 and a reagent grade Ca(OH) at the same time, it can be seen that the whiteness of the hand-sheet is improved to 90. Based thereon, it was found that it could be fully utilized in waste paper recycling.

Experimental Example 2

Manufacturing Hand-Sheet Using Deinked Pulp

Pulp slurry was prepared by setting the weight ratio of deinked pulp to 3% (where the weight ratio is the weight ratio of the dried deinked pulp when the mixed weight ratio of dried deinking pulp and water is 100%), and then 10%, 20%, 30% of Example 9 and Example 14 were added. Each of Examples 9 and 14 was added to the slurry, thoroughly stirred and then ground.

The final basis weight was maintained at 80 g/m$^2$ and a round sheet machine was used. The wetted wet sheet was dewatered sufficiently and then press dried through a drum type dryer.

The present disclosure is directed to providing a method of recycling a by-product generated in a papermaking process that treats the by-product generated in the papermaking process so as to enable it to be reused in a papermaking process.

When a method of recycling a by-product generated in a papermaking process according to the present disclosure is used, it is possible to reuse by-products generated in conventional papermaking processes such as lime mud and lime kiln CaO, which is environmentally friendly as well as cost-effective. Further, the level of whiteness of lime mud and lime kiln CaO which are by-products generated in a papermaking process can be improved to that of a high-grade raw material, and thereby it is possible to also improve the whiteness of paper.

Although detailed embodiments of a method of recycling a by-product generated in a papermaking process according to the present disclosure have been described above, it is apparent that various modifications can be made without departing from the scope of the present disclosure.

Therefore, the scope of the present invention should not be limited to the embodiments described, but should be determined by the equivalents of the claims, as well as the following claims.

It is to be understood that the above-mentioned embodiments are illustrative and not restrictive in all respects and that the scope of the present invention is indicated by the appended claims rather than the above-mentioned description, and all changes or modifications derived from the equivalents thereof should be construed as being included within the scope of the present invention.

DESCRIPTION OF SYMBOLS

S100: Preparing a pulverized product
S200: Preparing a burned product
S300: Preparing a hydrate
S400: Manufacturing into paper

What is claimed is:

1. A method of recycling a by-product generated in a papermaking process comprising:
    pulverizing a by-product produced in a papermaking process to prepare a pulverized product;
    burning the pulverized product to prepare a burned product;
    hydrating the burned product to prepare a hydrate; and
    manufacturing paper from the hydrate and a paper slurry;
    wherein the by-product generated in the papermaking process comprises at least one of lime mud, lime kiln CaO, and
    the by-product is obtained through an in-situ method for synthesizing precipitated calcium carbonate (PCC) filler in a pulp slurry.

2. The method of claim 1, wherein,
    burning the pulverized product is performed at a temperature of 900 to 1,300° C. for 0.5 to 3 hours.

3. The method of claim 1, wherein,
    hydrating the burned product is performed at a temperature of 20 to 90° C. for 3 to 12 hours after adding water.

4. The method of claim 1, wherein the hydrate is Ca(OH)$_2$.

5. The method of claim 1, wherein manufacturing the paper comprises,
    adding the paper slurry into a reaction tank,
    adding the hydrate into the reaction tank and mixing to form a mixture,
    injecting CO$_2$ gas into the mixture, and
    adding the CO$_2$ gas-injected mixture to a sheet former for molding into paper.

6. The method of claim 5, wherein the CO$_2$ gas is injected into the mixture at an injection rate of 50 cc/min.

7. The method of claim 5, wherein the paper slurry is deinked pulp slurry.

* * * * *